United States Patent
Aggarwal et al.

(10) Patent No.: US 9,361,285 B2
(45) Date of Patent: Jun. 7, 2016

(54) METHOD AND APPARATUS FOR STORING NOTES WHILE MAINTAINING DOCUMENT CONTEXT

(71) Applicant: Adobe Systems Incorporated, San Jose, CA (US)

(72) Inventors: Shilpi Aggarwal, Delhi (IN); Shradha Budhiraja Verma, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 123 days.

(21) Appl. No.: 14/230,654

(22) Filed: Mar. 31, 2014

(65) Prior Publication Data

US 2015/0278179 A1 Oct. 1, 2015

(51) Int. Cl.
*G06F 3/048* (2013.01)
*G06F 17/24* (2006.01)
*G06F 17/21* (2006.01)

(52) U.S. Cl.
CPC .......... *G06F 17/241* (2013.01); *G06F 17/212* (2013.01)

(58) Field of Classification Search
CPC .................................. G06F 17/241
See application file for complete search history.

(56) References Cited

U.S. PATENT DOCUMENTS

| 6,154,757 A | * | 11/2000 | Krause | G06F 3/0219 715/205 |
| 2007/0055926 A1 | * | 3/2007 | Christiansen | G06F 17/241 715/210 |
| 2014/0281903 A1 | * | 9/2014 | Le Chevalier | G06F 17/30011 715/234 |

* cited by examiner

*Primary Examiner* — Omar Abdul-Ali
(74) *Attorney, Agent, or Firm* — Keller Jolley Preece

(57) ABSTRACT

A computer implemented method and apparatus for storing notes while maintaining document context. The method comprises receiving a note; identifying a location within a document, the location associated with the note; generating metadata that identifies the document and the location; associating the metadata with the note; and causing storage of the note and the metadata.

20 Claims, 6 Drawing Sheets

METHOD AND APPARATUS FOR STORING NOTES WHILE MAINTAINING DOCUMENT CONTEXT

BACKGROUND OF THE INVENTION

1. Field of the Invention

Embodiments of the present invention generally relate to digital note-taking and, more particularly, to techniques for storing notes while maintaining document context.

2. Description of the Related Art

With the ubiquity of electronic document reading applications, users are moving away from reading paper documents and towards reading documents on their computers and other electronic devices with e-reader applications, such as READER, ACROBAT, Acrobat.com, and the like. Often, a user may take notes while reading a document. The user may take a note by copying and pasting a passage from the document to a storage location. In addition, a user may also add user created notes that are related to the document to the storage location. However, once notes are taken, the context of the document is lost. In other words, there is no connection back to a place in the document where the note was taken. Therefore, there is a need for a method and apparatus for storing notes while maintaining document context.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for storing notes while maintaining document context is described. The method receives a note and identifies a location within a document, the location corresponding to the note. The method then generates metadata that identifies the document and the location and associates the metadata with the note. The method then causes storage of the note and the metadata.

In another embodiment, an apparatus for storing notes while maintaining document context is described. The apparatus comprises a note taking module for receiving a note. The note taking module identifies a location within a document, the location corresponding to the note. The note taking module then generates metadata that identifies the document and the location and associates the metadata with the note. The note taking module then causes the note and the metadata to be stored on the server.

In yet another embodiment, a computer readable medium for storing notes while maintaining document context is described. The computer readable medium stores computer instructions that, when executed by at least one processor causes the at least one processor to perform the method for storing notes while maintaining document context.

Figure 1:
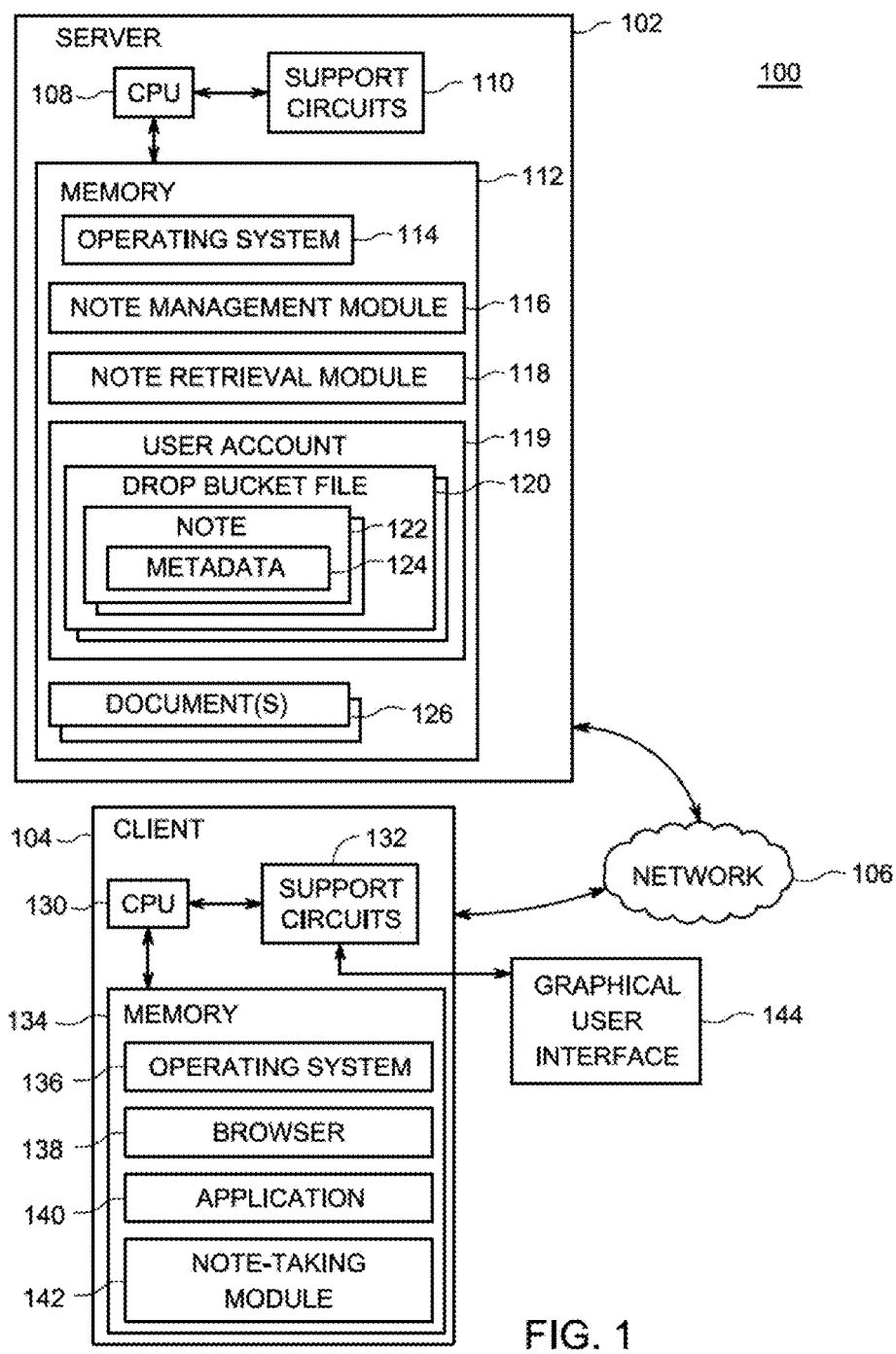
FIG. 1 is a block diagram of a system for storing notes while maintaining document context, according to one or more embodiments.

While the method and apparatus is described herein by way of example for several embodiments and illustrative drawings, those skilled in the art will recognize that the method and apparatus for storing notes while maintaining document context is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for storing notes while maintaining document context defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As previously explained, existing solutions fail to provide context when a note is copied from a document. Although context, such as a document name may be added manually, existing solutions fail to navigate automatically to an exact location in the original document from where the note was copied.

Thus, and in accordance with an embodiment of the present invention, techniques are provided herein that allow for copying selected content from a document and storing the content such that upon later selection of that content, the selected content is displayed in the original document at the location from which it was selected.

A user accesses a document using an application, for example an e-reader application. In one embodiment, the user invokes a tool to initiate a note-taking mode. In another embodiment, the application automatically opens in the note-taking mode. The note-taking mode indicates a configuration of the application that enables the user to take notes from the document. Notes include passages from the document (i.e., copied document content) or notes created by the user. User-created notes are annotations or comments the user wishes to store as a brief record of facts, topics, or thoughts. The note-taking mode also enables the user to organize notes into folders called "drop buckets". The user may create one or more "drop buckets" for organizing notes, where each drop bucket identifies a topic of interest, area of study, or any category that is useful to the user. The user accesses a document and selects content that the user wants to have stored as a note. The user selects the document content in various possible ways. In one example, the user drags and drops selected content, for example a sentence, paragraph, page, image, form field, graph, and the like, into a drop bucket. In another example, the user copies and pastes the selected content into a drop bucket. In yet another example, the user makes a right click on selected content and selects from a menu, an option of "add to drop bucket". In yet another example, the document content is selected using an eye tracking algorithm that identifies where a user is looking. The eye tracking algorithm then tracks the user's eye movement to a drop bucket. Any method of selecting document content and indicating a selection of a drop bucket to move the document content into may be used. The user may also add one or more user created notes to a drop bucket. To add a user-created note, in one embodiment, the user clicks in the drop bucket and enters comments or annotations.

When a note is added to the drop bucket, a location within the document is identified. The location corresponds to the note. The location identifies at least a page of the document where the note was taken. The note is then stored on a server. The server hosts or enables hosting of a web server, for example, Acrobat.com, or ACROBAT cloud service that is linked to the note-taking mode of the application. The user maintains an account with the web service. Further, metadata specifying the location of the note in the document is stored on the server. The location information for a copied passage of the document may include viewing attributes, such as a page number of the note, x, y coordinates of the note within the document in addition to a zoom level of the document, and the like. The coordinates and zoom level are stored so that at a later time, the user may view the note at a correct location in the document from any device. If the zoom level on a device is different from the zoom level stored, the x, y coordinates may be adjusted based on the new zoom level.

The note is stored in a file on the server. The file is associated with the drop bucket in which the note was placed. If the drop bucket is a newly created drop bucket, the file associated with the drop bucket is created. If the drop bucket is not a newly created drop bucket, then the file associated with the drop bucket already exists on the server. The metadata that includes a document identifier, and location information that identifies where the note is located within the document are also stored in the file associated with the drop bucket. The document identifier is a tag that identifies the document. The location information for a user added note may include a page number of the document that was displayed when the note was added. Thus, when retrieved at a later time, the document is displayed with the note identified at a correct location.

The user may select and store notes from multiple documents on multiple devices. The notes are stored on the server so they may be retrieved by the user from any device. When the user wishes to access the user's notes, the user logs into their account on the server. The user is provided an option to search drop buckets associated with the user's account. The user may search a single drop bucket, all of their drop buckets, or search one or more drop buckets based on a word or phrase. Alternatively, the user may view all notes from a drop bucket. When a note is selected for viewing, the metadata stored with the note is used to identify the original document from which the note was copied. In some embodiments, the document is then opened to the exact location where the note was added. Thus, a user may easily view his or her notes at one place across devices and platforms and can easily access or retrieve the original document by clicking on a particular note.

As used herein, notes include document content selected by the user, user entered text, or both. The notes can include any form of content, for example text, images, videos, annotations, comments, edited text, struck-off text, form-field, and the like. In some embodiments, the user entered text includes annotations or comments the user wishes to store as a brief record of facts, topics, or thoughts.

Advantageously, the present invention may be used as a plug-in to or implemented as part of an e-reader application, such as ACROBAT, READER, ADOBE READER MOBILE, and the like. In some embodiments, the present invention may be a plug-in on a client device. In some embodiments, the present invention may be a plug-in on a server. The present invention enables user to keep related notes from documents along with their context information in one place. Users can easily search among the notes and can easily navigate to the exact location of the note in the original document without having to manually maintain the location information. In such embodiments where the documents and notes are stored on the server, such as a cloud server, the user may access the document and notes from any device or system.

Various embodiments of a method and apparatus for storing notes while maintaining document context are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for storing notes while maintaining document context, according to one or more embodiments. The system 100 includes a server 102 and a client 104, communicatively coupled to one another via a network 106. The server 102 may be in the cloud, e.g., a blade server, virtual machine, and the like. Examples of the server 102 include, but are not limited to desktop computers, laptops, tablet computers, Smartphones, and the like. The server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, a note management module 116, a note retrieval module 118, and a plurality of user accounts 119. Each user account 119 includes one or more drop bucket files 120, where each drop bucket file 120 includes one or more notes 122 and one or more documents 126. Each note 122 includes metadata 124. In some embodiments, the one or more documents 126 are stored outside of the drop bucket file 120 in the user account 119. The operating system 114 may include various commercially known operating systems.

The client 104 is a computing device, such as a desktop computer, laptop, tablet computer, Smartphone, and the like. The client 104 includes a Central Processing Unit (CPU) 130, support circuits 132, and a memory 134 and includes or is connected to a graphical user interface 144. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like.

The memory 134 includes an operating system 136, a browser 138, an application 140, and a note-taking module 142. The operating system 136 may include various commercially known operating systems. The application 140 may be any e-reader application, such as ACROBAT, ADOBE READER MOBILE, and the like. The application 140 may reside on the client 104. Alternatively, the user may access an e-reader application via the browser 138 while viewing a document on the Internet. For example, Acrobat.com provides an online service for accessing documents.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

When an e-reader application 140 is opened in a note-taking mode, a user is able to create one or more notes from content within a document. The notes may be stored together in a global note area, or the user may create drop buckets that are named to identify topics of interest, areas of study, or any categories that are useful to the user. The global note area is a drop bucket that does not identify a specific topic, but is used as a general drop bucket for general or miscellaneous notes.

The note-taking module 142 provides an option via the graphical user interface 144 to enable the user to create one or more drop buckets in which the user may store the created notes. In addition to the document, a list of existing drop buckets is displayed. The drop buckets previously created by the user are identified by areas of interest. For example, the user may have previously created and named drop buckets for the topics "3D Animation", "Font Rendering", and "Gaming Theory". In addition, a "Global Drop Bucket" is available where a user may drop notes on any topic. If the user chooses to create a new drop bucket for a current research project, the user may select a "Create New Drop Bucket" option and name the new drop bucket. For example, the user may choose to create a new drop bucket titled "How to Write a White Paper".

As the user accesses a document, the user selects content that the user would like to have stored. The user may drag and drop selected content, for example a sentence, paragraph, page, image, form field, and the like, into a drop bucket. For example, the user may find a paragraph of interest, highlight the paragraph text, and drag and drop it to into the "How to Write a White Paper" drop bucket. The user may also select a drop bucket and add user-created notes directly into the drop bucket. Selected content and user created notes are hereafter referred to as notes. When the note is added to the drop bucket, the note-taking module 142 uploads the document that the user is accessing when the note is taken. The document is uploaded to a user account on the server 102. The note-taking module 142 generates metadata associated with the note. The metadata includes a document identifier (that is, a tag that identifies the document), location information corresponding to the note that identifies where the note is located within the document. In some embodiments the name of the associated user-created drop bucket may be included in the metadata. The location information for a user created note includes a page number of the document. The location information for selected content from the document may include viewing attributes, such as a page number of the note, x, y coordinates of the note within the document, a zoom level of the document, and the like. The coordinates and zoom level are stored so that at a later time, the user may view the note and document from any device. If the zoom level on a device is different from the zoom level stored, the x, y coordinates may be adjusted based on the new zoom level. The note-taking module 142 uploads the note and the metadata to the server 102 via network 106.

On the server 102, the note management module 116 receives the document and note with its associated metadata. The note management module 116 stores the document as document 126. If the associated drop bucket is newly created, the note management module 116 creates a drop bucket file 120 for the drop bucket. If the drop bucket was previously created, then the drop bucket file 120 associated with the drop bucket already exists on the server 102. The note management module 116 stores the note 122 and its associated metadata 124 in the drop bucket file 120. The user may select and store notes 122 from multiple documents on multiple devices. The note management module 116 stores each note 122 on the server 102 so the note 122 and the document 126 from where the note 122 was added may be retrieved by the user from any device.

When the user wishes to access the user's notes, the user logs into their user account 119 on the server 102. The note retrieval module 118 provides the user an option to input a request to search drop buckets associated with the user's account 119. The user may search a single drop bucket, all of the drop buckets, or search one or more drop buckets based on a word or phrase. Alternatively, the user may view all notes from a drop bucket. The note retrieval module 118 accesses one or more drop bucket files 120 to retrieve a list of notes 122 based on the user input. When a note is selected, the note retrieval module 118 accesses the metadata 124 that is stored with the note 122 to identify the original document 126 from which the note 122 was copied. The document 126 is then opened to the exact location where the note 122 was added.

Figure 2:
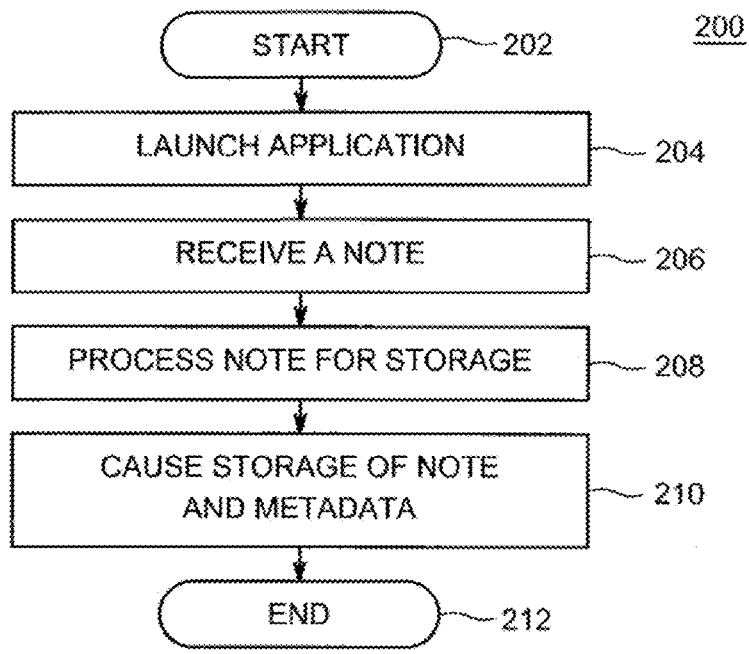
FIG. 2 depicts a flow diagram of a method for processing notes in order to maintain document context, as performed by the note-taking module of FIG. 1, according to one or more embodiments.

FIG. 2 depicts a flow diagram of a method 200 for processing notes in order to maintain document context, as performed by the note-taking module 142 of FIG. 1, according to one or more embodiments. The method 200 starts at step 202 and proceeds to step 204.

At step 204, the method 200 launches an e-reader application. The e-reader application is launched when, for example, a user selects a document to read. The e-reader application may be launched in a note-taking mode, or after launch, a note-taking mode of the e-reader application may be selected by the user. The method 200 displays the document and, in addition, displays a panel that includes a drop bucket list of drop buckets that were previously created by the user. For example, the user may open a document that discusses the topic of "How to Write a White Paper". The drop bucket list includes entries for "3D Animations", "Font Rendering", and "Gaming Theory". The drop bucket list also includes an option to create a new drop bucket. In the present example, the user may plan to read a number of documents on the topic of "White Paper" and wish to have a specific drop bucket for the topic of "White Paper". When the "Create New Drop Bucket" option is selected by a user, the method 200 creates a new drop bucket in the drop bucket list and prompts the user to name the new drop bucket. In the present example, the user names the new drop bucket "White Paper".

The method 200 proceeds to step 206, where the method 200 receives a note in a drop bucket. Various methods may be utilized to place the note in the drop bucket. A user, for example, selects content of the document, and drags and drops the document content into the drop bucket. In another example, the user copies and pastes document content into the drop bucket. In another example, the user selects document content, makes a right click on the selected document content and select "Add to Drop Bucket" from a pull-down menu. In yet another example, the document content is selected using an eye tracking algorithm that identifies where a user is looking. The eye tracking algorithm then tracks the user's eye movement to a drop bucket. Alternatively, the user may select the drop bucket and type a user-created note in the drop bucket. In some embodiments, the user selects a drop bucket by doubling clicking the drop bucket. When the drop bucket is open, the user may then begin typing in the drop bucket. In some embodiments, the user right clicks on a drop bucket and selects "Enter note" from a dropdown menu. In the present example, the user selects a paragraph from the document, and drags and drops the selected paragraph into the drop bucket titled "How to write a White Paper".

The method 200 proceeds to step 208, where the method 200 processes the note for storage. The method 200 identifies a document identifier for the document as well as an identifier (e.g., name) of the drop bucket in which the note was placed. Identifying the document identifier allows the document to be displayed when the note is later reviewed by the user. Identifying the drop bucket allows the notes to later be searched based on the drop bucket in which they were placed. The method 200 generates metadata for the note that includes the document identifier and the identifier of the drop bucket.

If the note is a user-created note, the method 200 identifies a page number of the document and stores the page number in the metadata. The page number is stored for future use when the note is later reviewed by the user. Should the user want to review the note, the page of the document that the user was reading when the note was taken is displayed to the user for additional reference, thereby giving context to the note. In various embodiments, use of various existing technologies can be made to identify context of the document that needs to be stored. For example, in one embodiment, by using an eye tracking algorithm, a particular section on the page of the document where the user is looking can be identified as the context of the document. The coordinates corresponding to the identified section can be stored as the metadata. In another embodiment, a last accessed section on the page of the document can be identified as the context of the document.

If the note includes document content, the method 200 identifies a page number of the document, and x,y coordinates within the page where the document content is located. The method 200 also identifies a zoom level of the document. In one example, the document has the document identifier, Doc123. The note is located on page 3, and the x, y coordinates for the document are 50, 100 for zoom level 200%. The coordinates and zoom level are stored so that at a later time, the user may view the note at a correct location in the document from any device. If the zoom level on a device is different from the zoom level stored, the x, y coordinates may be adjusted based on the zoom level of the device. The method 200 stores the page number, x,y coordinates, and zoom level in the metadata.

The method 200 proceeds to step 210, where the method 200 causes the note, document, and metadata to be stored. The method 200 determines whether a file for the drop bucket currently exists in a memory of the user's device. The drop bucket may be a global drop bucket, a drop bucket for a specific topic that the user had previously created, or a newly-created drop bucket. If the drop bucket is a newly created drop bucket, then a file associated with the drop bucket does not exist on the user's device. As such, the method 200 creates a file for the drop bucket. Whether the file for the drop bucket already existed or is newly created, the method 200 stores the document, the note, and the associated metadata in memory.

In some embodiments, the method 200 causes the note, document, and metadata to be stored on a server. In such embodiments, if the user has not yet signed into the server using the user's account identifier, the method 200 facilitates signing the user into the server. The method 200 facilitates sending the request along with the note, the document, and the metadata to the server, causing the note, document, and metadata to be stored as described in further detail with respect to FIG. 3 below.

In yet another embodiment, the steps of method 200 are performed on a server. In such embodiment, documents accessed via a browser reside in a document repository, for example, Acrobat.com. The server has a headless browser that mimics behavior of the browser on the client. After launching the application on the user device to view a document, the method 200 proceeds to step 206. At step 206, the method 200 receives a note using any of various existing technologies to identify context of the document that needs to be stored.

The method 200 proceeds to step 208, where method 200 processes the note for storage. The method 200 identifies a document identifier for the document as well as an identifier (e.g., name) of the drop bucket in which the note was placed. The method 200 generates metadata for the note that includes the document identifier and the identifier of the drop bucket. If the note is a user-created note, the method 200 identifies a page number of the document and stores the page number in the metadata. If the note includes document content, the method 200 identifies a page number of the document, x,y coordinates within the page where the document content is located, and a zoom level of the document.

The method 200 proceeds to step 210, where the method 200 causes the note and metadata to be stored. Due to the fact that the method 200 is executing on the server, which is a document repository, the document is already stored. In such embodiment, the method 200 determines whether a file for the drop bucket currently exists in user's account. The drop bucket may be a global drop bucket, a drop bucket for a specific topic that the user had previously created, or a newly-created drop bucket. If the drop bucket is a newly created drop bucket, then a file associated with the drop bucket does not exist in the user's account. As such, the method 200 creates a file for the drop bucket. Whether the file for the drop bucket already existed or is newly created, the method 200 stores the note and the associated metadata in the user's account in the drop bucket file. The method 200 proceeds to step 212 and ends.

Figure 3:
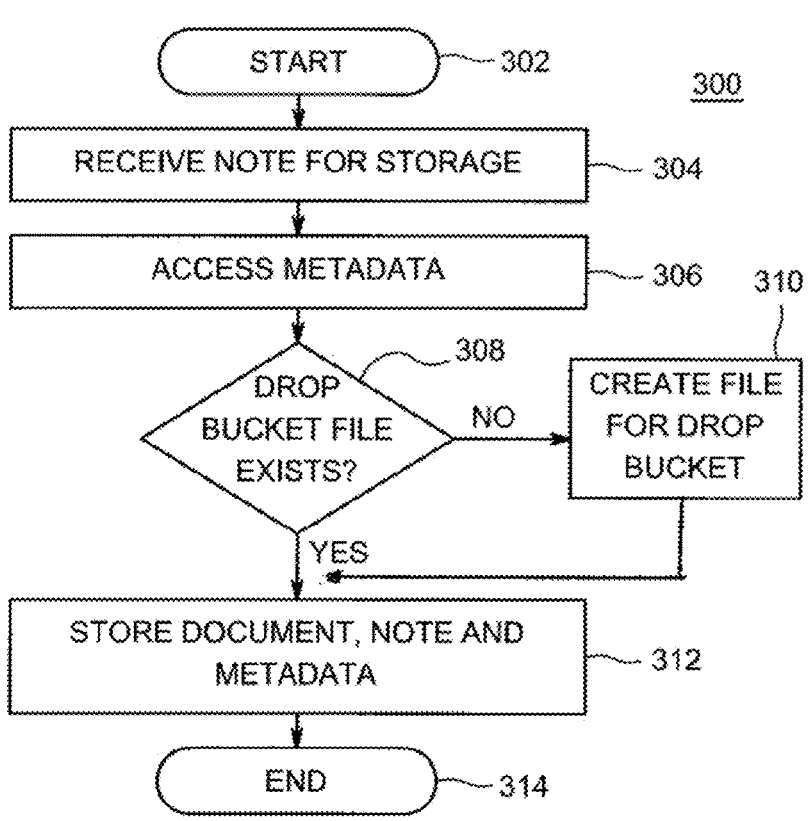
FIG. 3 depicts a flow diagram of a method for storing a note, as performed by the note management module of FIG. 1, according to one or more embodiments.

FIG. 3 depicts a flow diagram of a method 300 for storing a note, as performed by the note management module 116 of FIG. 1, according to one or more embodiments. The method 300 starts at step 302 and proceeds to step 304.

At step 304, the method 300 receives a request to store a note. The request is associated with the user account. The request includes a note, metadata associated with the note, and a document.

The method 300 proceeds to step 306, where the method 300 accesses the metadata for the note. The method 300 identifies the drop bucket associated with the note. The drop bucket may be a global drop bucket, a drop bucket for a specific topic that the user had previously created, or a newly-created drop bucket. If the drop bucket is a newly created drop bucket, then a file associated with the drop bucket does not exist in the user's account.

The method 300 proceeds to step 308, where the method 300 determines whether a file for the drop bucket currently exists in the user's account. If the file for the identified drop bucket does not exist in the user's account the method 300 proceeds to step 310, where the method 300 creates a file for the drop bucket. The method 300 then proceeds to step 312. However, if at step 308, the method 300 determines that the file for the identified drop bucket exists, the method 300 proceeds directly to step 312.

At step 312, the method 300 stores the note and the associated metadata in the user's account. If the document is not already stored, the document is also stored. The method 300 proceeds to step 314 and ends.

Figure 4:
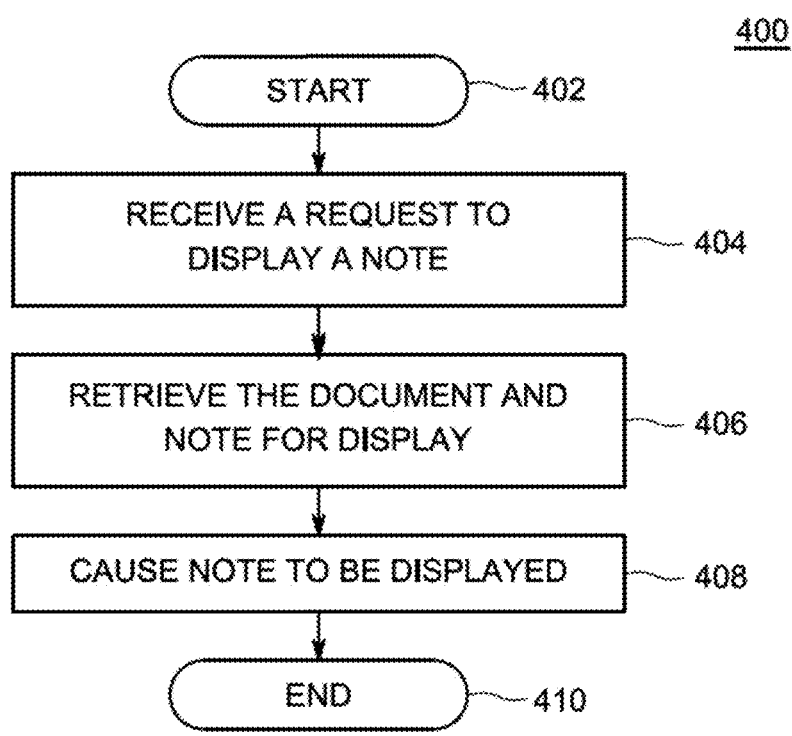
FIG. 4 depicts a flow diagram of a method for retrieving notes stored in a user account as performed by the note retrieval module of FIG. 1, according to one or more embodiments.

FIG. 4 depicts a flow diagram of a method 400 for retrieving notes as performed by the note retrieval module 118 of FIG. 1, according to one or more embodiments. The method 400 provides a user interface for a user to view and select notes. Upon receipt of a selection, the method 400 provides for display of the retrieved note at the location in the original document from which it was selected and copied. The method 400 starts at step 402 and proceeds to step 404.

At step 404, the method 400 receives a request to display a note. The method 400 displays a user interface for searching for notes. The method 400 provides options for a user to view all notes in a drop bucket, or to search a specific drop bucket, all drop buckets, or a global drop bucket for specific terms or phrases. The method 400 receives an input of one of the user options. Upon receipt of the user input, the method 400 retrieves a list of notes from notes stored on the user's device. For example, if the user selects a drop bucket, the method 400 displays all notes from the drop bucket. In another example, the user enters a word or phrase. The user may also select one or more drop buckets from which to search. The method 400 searches the one or more drop buckets and displays all notes from the one or more drop buckets that include the word or phrase. In some embodiments, where the notes are stored on a server, the method 400 sends a request to the server to retrieve the list of notes stored in the user's account. The method 400 then displays the retrieved notes. The method 400 receives a request to view a particular note from the list of retrieved notes and which time the method 400 proceeds to step 406.

At step 406, the method 400 accesses the metadata of the selected note. The metadata includes a document identifier that identifies the document from which the note was copied. The method 400 retrieves the document from the documents that are stored in the user's device. In some embodiments, where the notes are stored on the server, the method 400 sends a request to the server to retrieve the document from the documents that are stored in the user's account.

The method 400 proceeds to step 408, where the method 400 causes the note to be displayed. The method 400 displays the document at the location of the note. If the note is a user created note, the method 400 identifies, from the metadata, the page of the document that was displayed when the note was added, and displays the document page with the user created note. If the note was selected content from the document, the method 400 determines the page number and the zoom level of the document for display. For example, the zoom level for display may be 100%. The method 400 accesses the metadata for the note and adjusts the location of the note based on the zoom level. In the previous example, the note was selected and copied from a location starting on page 3 with x, y coordinates of 100, 50 at a zoom level of 200%. If the document is currently being displayed at 100%, the method 400 displays page 3, but in order to correctly identify the location of the start of the note, must adjust the device (or screen) location coordinates based on the current zoom level. At 100%, the x, y coordinates are 50, 25. The method 400 displays page 3 of the document, with the note being identified in the display. The method 400 may identify the note by placing the cursor at the x, y coordinate or may identify the note by highlighting the first word at the x, y coordinates. Any form of identification may be used to identify the location of the note within the document. The method 400 proceeds to step 410 and ends.

Figure 5:
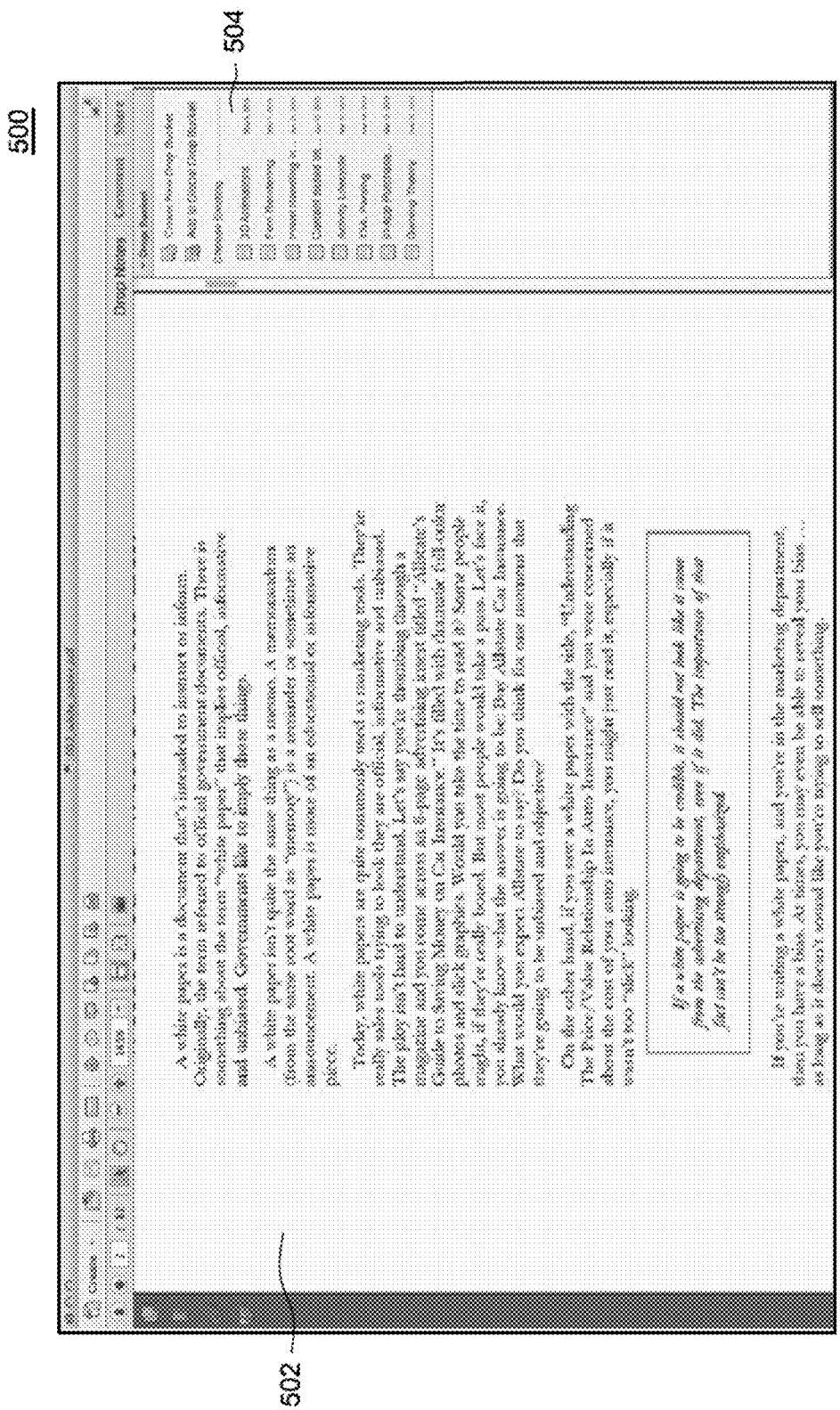
FIG. 5 illustrates an exemplary user interface that may be used in accordance with an embodiment of the present invention.

FIG. 5 illustrates an exemplary user interface 500 that may be used in accordance with an embodiment of the present invention. User interface 500 includes a document 502, and a panel 504 that provides options for a user. The panel 504 includes options for creating a new drop bucket, adding a note to a global drop bucket, and a list of existing drop buckets. The document 502 discusses the topic of "How to Write a White Paper". In Panel 504, there is no drop bucket for the topic of "How to Write a White Paper". A user may select the "Create New Drop Bucket" option to create a new drop bucket for "How to Write a White Paper".

Figure 6:
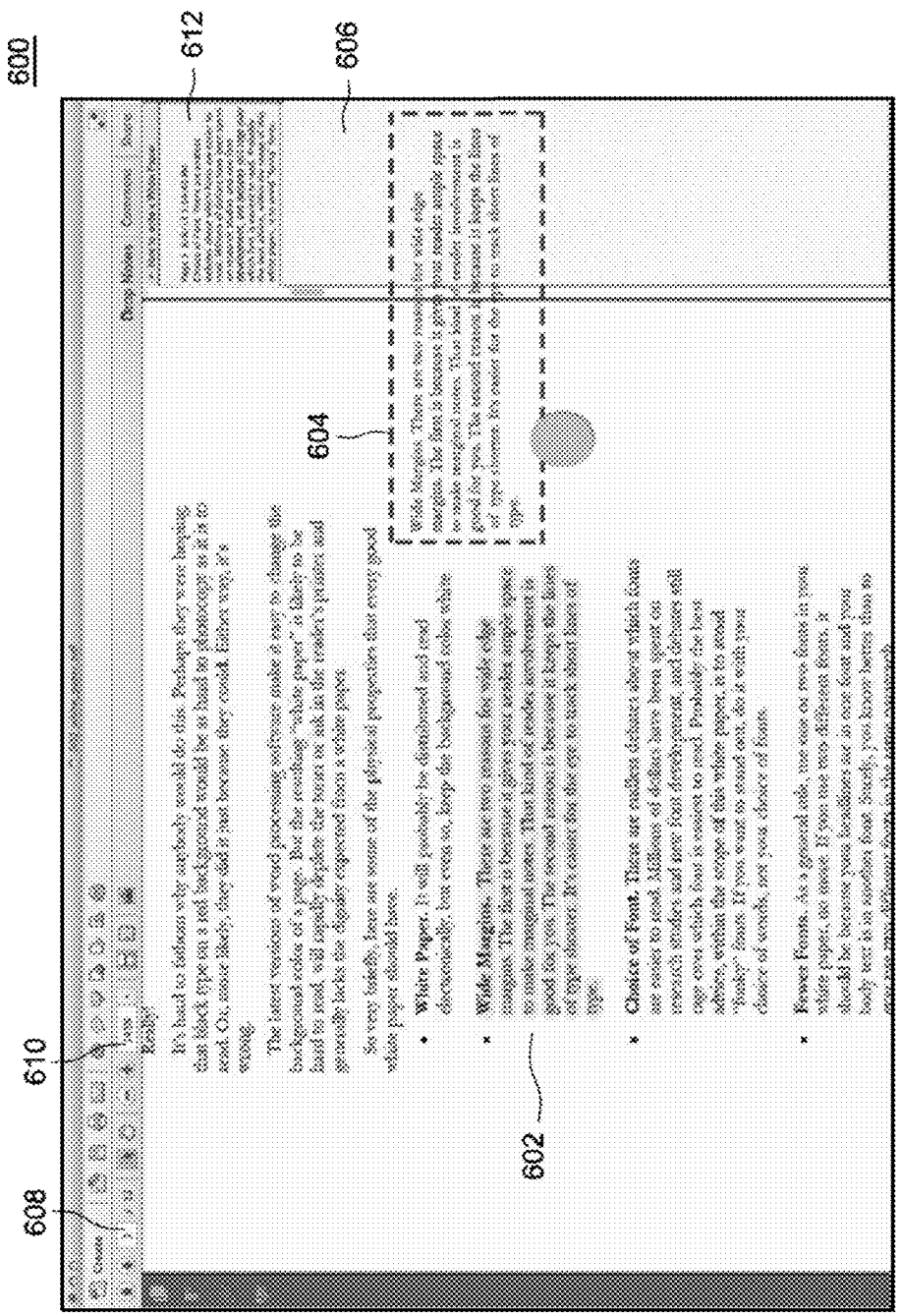
FIG. 6 illustrates an exemplary user interface that may be used in accordance with an embodiment of the present invention.

FIG. 6 illustrates an exemplary user interface 600 that may be used in accordance with an embodiment of the present invention. User interface 600 illustrates adding notes to a drop bucket. The user interface 600 includes a selected note 602. The selected note 602 is a bullet item titled "Wide Margins". The selected note 602 is moved into the "How to Write a White Paper" drop bucket 606 by performing a drag and drop action 604 on the selected note 602. When the drag and drop action 604 is complete and the selected note 602 is dropped into the "How to Write a White Paper" drop bucket 606, the page number 608, zoom level 610, location information (not shown) and the document are sent to the server to be stored in a user's account. The selected note 602 then resides in the drop bucket 606 along with a previously selected and stored note 612.

Figure 7:
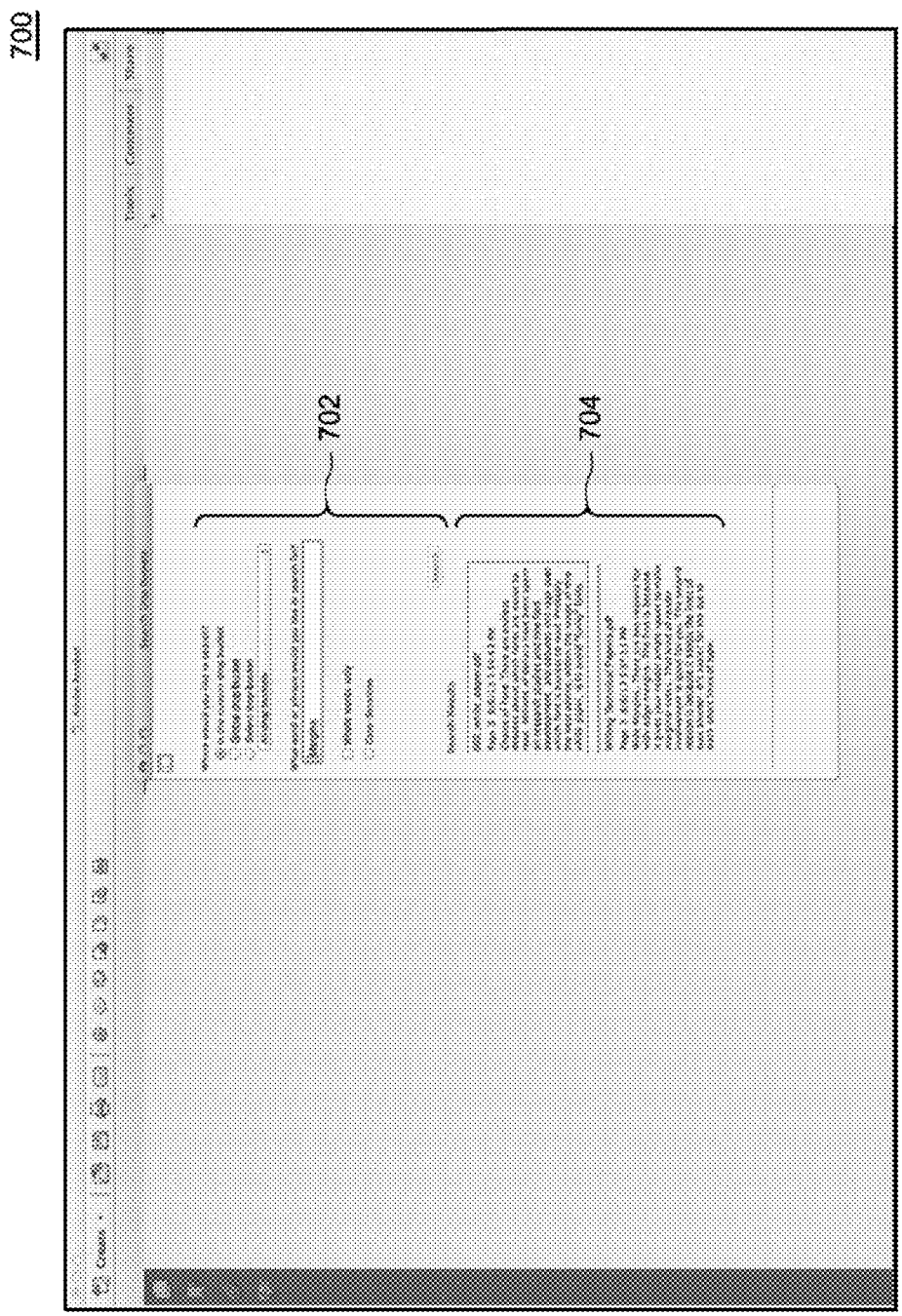
FIG. 7 illustrates an exemplary user interface that may be used in accordance with an embodiment of the present invention.

FIG. 7 illustrates an exemplary user interface 700 that may be used in accordance with an embodiment of the present invention. User interface 700 includes a search area 702 and a search results area 704. The search area 702 allows a user to input which drop buckets are to be searched or viewed and optionally what words or phrases to search for. The search results area 704 displays a list of the retrieved notes based on the search criteria entered in the search area 702. When a note is selected, the document is displayed at the location of the note.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   receiving a note;
   processing the note, wherein processing comprises:
      identifying a location within a document, the location corresponding to the note, wherein identifying the location comprises identifying x, y coordinates and a zoom level of the document;
      generating metadata that identifies the document and the location; and
      associating the metadata with the note; and
   causing storage of the note and the metadata.

2. The method of claim 1, wherein the note is one of selected document content or a user created note.

3. The method of claim 2, further comprising:
   receiving a request to display the note;
   retrieving the document and the note using the metadata; and
   causing to display the document including the note at the location from where the note was received.

4. The method of claim 2, wherein the selected document content is at least one of a sentence, paragraph, page, image, or a form-field.

5. The method of claim 3, wherein displaying the note when the note is selected document content comprises:
   displaying the document;
   determining a zoom level of the document for the display;
   adjusting x, y coordinates that identify a location on the display for the selected document content at an original zoom level for the zoom level; and identifying the selected document content at the adjusted location in the document.

6. The method of claim 1, further comprising:
creating one or more drop buckets for receiving the note,
wherein a drop bucket is at least one of a drop bucket identifying a topic of interest or a global drop bucket for storing document content of an unspecified topic.

7. The method of claim 3, wherein receiving the request comprises:
identifying search criteria in which to search at least one of a drop bucket of a plurality of drop buckets or all drop buckets of the plurality of drop buckets, where the search criteria comprises a word or phrase.

8. An apparatus for storing notes while maintaining document context comprising:
one or more processors, and
a non-transitory storage medium storing instructions, that when executed by the one or more processors, cause the apparatus to perform steps comprising:
receiving a note;
identifying a location within a document from where the note was received, wherein identifying the location comprises identifying x, y coordinates and a zoom level of the document;
generating metadata that identifies the document and the location;
associating the metadata with the note; and
causing storage of the note, the document, and the metadata.

9. The apparatus of claim 8, wherein the note is one of selected document content or a user created note.

10. The apparatus of claim 9, further comprising instructions, that when executed by the one or more processors, cause the apparatus to performs the steps of:
receiving a request to display the note, where receiving the request comprises:
identifying search criteria in which to search at least one of a drop bucket of a plurality of drop buckets or all drop buckets of the plurality of drop buckets, where the search criteria comprise a word or phrase;
retrieving the document and the note for display; and
causing to display the note and the document at the location from where the note was received.

11. The apparatus of claim 9, wherein the selected document content is at least one of a sentence, paragraph, page, image, or form-field.

12. The apparatus of claim 10, wherein displaying the note when the note is selected document content comprises:
displaying the document;
determining a zoom level of the document for the display;
adjusting x, y coordinates that identify a location on the display for the selected document content at an original zoom level for the zoom level; and
identifying the selected document content at the adjusted location in the document.

13. The apparatus of claim 8, further comprising instructions, that when executed by the one or more processors, cause the apparatus to perform steps comprising:
creating one or more drop buckets for receiving the note,
wherein a drop bucket is at least one of a drop bucket identifying a topic of interest or a global drop bucket for storing a note of an unspecified topic.

14. A non-transitory computer readable medium for storing computer instructions that, when executed by at least one processor causes the at least one processor to perform a method for storing notes while maintaining document context comprising:
receiving a note;
identifying a location within a document, the location corresponding to the note, wherein identifying the location comprises identifying x, y coordinates and a zoom level of the document;
generating metadata that identifies the document and the location;
associating the metadata with the note; and
causing storage of the note and the metadata.

15. The computer readable medium of claim 14, wherein the note is one of selected document content or user created text.

16. The computer readable medium of claim 15, further comprising:
receiving a request to display the note;
retrieving the document and the note using the metadata; and
causing to display the document including the note at the location from where the note was received.

17. The computer readable medium of claim 15, wherein the selected document content is at least one of a sentence, paragraph, page, image, or form-field.

18. The computer readable medium of claim 16, wherein displaying the note when the note is selected document content comprises:
displaying the document;
determining a zoom level of the document for the display;
adjusting x, y coordinates that identify a location on the display for the selected document content at an original zoom level for the zoom level; and
identifying the selected document content at the adjusted location in the document.

19. The computer readable medium of claim 14, further comprising:
creating one or more drop buckets for receiving the note,
wherein a drop bucket is at least one of a drop bucket identifying a topic of interest or a global drop bucket for storing document content of an unspecified topic.

20. The computer readable medium of claim 16, wherein receiving the request comprises:
identifying search criteria in which to search at least one of a drop bucket of a plurality of drop buckets or all drop buckets of the plurality of drop buckets, where the search criteria comprises a word or phrase.

* * * * *